US008624779B2

(12) United States Patent
Ferguson (10) Patent No.: US 8,624,779 B2
(45) Date of Patent: Jan. 7, 2014

(54) GLOBAL NAVIGATION SATELLITE SYSTEM (GNSS) REFERENCE STATION INTEGRITY MONITORING AND ASSURANCE (75) Inventor: Kendall Ferguson, Stafford, VA (US)

(73) Assignee: Trimble Navigation Limited, Sunnyvale, CA (US)

(*) Notice: Subject to any disclaimer, the term of this patent is extended or adjusted under 35 U.S.C. 154(b) by 252 days.

(21) Appl. No.: 13/070,677

(22) Filed: Mar. 24, 2011

(65) Prior Publication Data
US 2011/0285586 A1 Nov. 24, 2011

Related U.S. Application Data (60) Provisional application No. 61/345,955, filed on May 18, 2010.

(51) Int. Cl.
G01S 19/20 (2010.01)
(52) U.S. Cl.
USPC .................................................. 342/357.58
(58) Field of Classification Search
USPC .................................................. 342/357.58
See application file for complete search history.

(56) References Cited

U.S. PATENT DOCUMENTS 5,884,220 A  3/1999 Farmer
5,936,573 A  8/1999 Smith

2006/0267838 A1  11/2006 Bird
2006/0279455 A1* 12/2006 Bird et al. ................ 342/357.06
2009/0262013 A1  10/2009 Vollath

OTHER PUBLICATIONS

Warner, Jon S., et al., "GPS Spoofing Countermeasures", *Los Alamos Research Paper LAUR-03-6163.*, (Dec. 2003),7 pages.
Brandon, John "GPS Jammers Illegal, Dangerous and Very Easy to Buy", FOXNews.com, (Mar. 17, 2010),3 Pages.
Ganapati, Priva "Reseachers Demonstrate How to Spoof GPS Devices", http://www.wired.com/gadgetlab/2008/09/researchers-dup/#ixzz0iclHowzU. (Sep. 29, 2008),3 Pages.
Bland, Eric "GPS 'Spoofing Could Threaten National Security", *Discovery News*, (Oct. 2, 2008),2 pages.
Humphreys, Todd E., et al., "Assessing the Spoofing Threat", *GPS World*, http://www.gpsworld.com/defense/security-surveillance/assessing-spoofing-threat-3171?page_id=1, (Jan. 1, 2009),13 pages.

* cited by examiner

Primary Examiner — Harry Liu (57) ABSTRACT

In a method of Global Navigation Satellite System (GNSS) reference station integrity monitoring, network Real Time Kinematic (RTK) information is accessed for a location associated with a GNSS reference station. At least one aspect of GNSS information local to the location of the GNSS reference station is compared with a corresponding aspect of the network RTK information. The results of the comparing are monitored for indication of occurrence of compromise to operational integrity of the GNSS reference station.

21 Claims, 7 Drawing Sheets

```
┌─────────────────────────────────────────────────────────────────┐
│ ACCESS NETWORK REAL TIME KINEMATICS (RTK) INFORMATION FOR A    │
│ LOCATION ASSOCIATED WITH A GNSS REFERENCE STATION.             │
│ 410                                                             │
└─────────────────────────────────────────────────────────────────┘
                              ↓
┌─────────────────────────────────────────────────────────────────┐
│ COMPARE AT LEAST ONE ASPECT OF GNSS INFORMATION LOCAL TO THE   │
│ LOCATION OF THE GNSS REFERENCE STATION WITH A CORRESPONDING    │
│ ASPECT OF THE NETWORK RTK INFORMATION.                          │
│ 420                                                             │
└─────────────────────────────────────────────────────────────────┘
                              ↓
┌─────────────────────────────────────────────────────────────────┐
│ MONITOR RESULTS OF THE COMPARING FOR INDICATION OF OCCURRENCE  │
│ OF COMPROMISE TO OPERATIONAL INTEGRITY OF THE GNSS REFERENCE   │
│ STATION.                                                        │
│ 430                                                             │
└─────────────────────────────────────────────────────────────────┘
     │
     │  ┌ ─ ─ ─ ─ ─ ─ ─ ─ ─ ─ ─ ─ ─ ─ ─ ─ ─ ─ ─ ─ ─ ─ ─ ─ ─ ─ ┐
     │    IN RESPONSE TO MONITORING AN INDICATION OF OCCURRENCE
     │    OF A COMPROMISE TO THE OPERATIONAL INTEGRITY, PROVIDE
     └→│  A COMPROMISE NOTIFICATION TO A USER OF THE GNSS         │
          REFERENCE STATION.
     │    440                                                     │
        └ ─ ─ ─ ─ ─ ─ ─ ─ ─ ─ ─ ─ ─ ─ ─ ─ ─ ─ ─ ─ ─ ─ ─ ─ ─ ─ ┘
     │
        ┌ ─ ─ ─ ─ ─ ─ ─ ─ ─ ─ ─ ─ ─ ─ ─ ─ ─ ─ ─ ─ ─ ─ ─ ─ ─ ─ ┐
          IN RESPONSE TO MONITORING AN INDICATION OF OCCURRENCE
     │    OF A COMPROMISE TO THE OPERATIONAL INTEGRITY, UTILIZE   │
     └→   GNSS INFORMATION FROM AN RTK NETWORK TO REPLACE LOCAL
        │ OVER-THE-AIR GNSS SIGNALS IN THE OPERATION OF THE GNSS  │
          REFERENCE STATION.
        │ 450                                                     │
        └ ─ ─ ─ ─ ─ ─ ─ ─ ─ ─ ─ ─ ─ ─ ─ ─ ─ ─ ─ ─ ─ ─ ─ ─ ─ ─ ┘
```

COMPARE AT LEAST ONE ASPECT OF GNSS INFORMATION LOCAL TO A LOCATION OF A GNSS REFERENCE STATION WITH A CORRESPONDING ASPECT OF NETWORK REAL TIME KINEMATICS (RTK) INFORMATION FOR THE LOCATION.
510

MONITOR FOR THE AT LEAST ONE ASPECT OF GNSS INFORMATION LOCAL TO THE LOCATION OF THE GNSS REFERENCE STATION TO VARY FROM THE CORRESPONDING ASPECT OF THE NETWORK RTK INFORMATION IN EXCESS OF A THRESHOLD ASSOCIATED WITH THE AT LEAST ONE ASPECT, WHEREIN EXCEEDING THE THRESHOLD IS AN INDICATION OF AN OCCURRENCE OF A COMPROMISE TO OPERATIONAL INTEGRITY OF THE GNSS REFERENCE STATION.
520

IN RESPONSE TO MONITORING AN INDICATION OF OCCURRENCE OF A COMPROMISE TO THE OPERATIONAL INTEGRITY, UTILIZE GNSS INFORMATION FROM AN RTK NETWORK TO REPLACE LOCAL OVER-THE-AIR GNSS SIGNALS IN THE OPERATION OF THE GNSS REFERENCE STATION.
530

ADJUST THE THRESHOLD BASED UPON HISTORICAL INFORMATION FOR THE LOCATION.
540

GLOBAL NAVIGATION SATELLITE SYSTEM (GNSS) REFERENCE STATION INTEGRITY MONITORING AND ASSURANCE

RELATED U.S. APPLICATION

This application claims priority to the copending provisional patent application, Ser. No. 61/345,955, entitled "GLOBAL NAVIGATION SATELLITE SYSTEM (GNSS) REFERENCE STATION INTEGRITY MONITORING AND ASSURANCE," with filing date May 18, 2010, assigned to the assignee of the present application, and hereby incorporated by reference in its entirety.

BACKGROUND

Various types of positioning systems for determining a position based on radio signals are known in the art. For example, satellite navigation systems allow autonomous geospatial positioning with virtually global coverage. Global navigation satellite systems (GNSS) provide GNSS receivers with the capability to determine their location based on positioning signals transmitted from the GNSS satellites in terms of longitude, latitude and altitude, to within a few meters or even centimeters.

A GNSS makes use of a constellation of satellites orbiting the earth to provide signals to a receiver that estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, and the GALILEO system currently being deployed by the European Union (EU). Additional systems such as Galileo (European Union) and Compass (China) are planned. A GNSS receiver typically utilizes signals from satellites of one or more of such Global Navigation Satellite Systems.

The civilian uses of GNSS receivers for surveying, positioning, navigation, tracking, timing, and many other uses has become very widespread. Unfortunately, the nature of the GNSS signals and GNSS receivers (at least from a civilian perspective) is that they are very weak and are easily susceptible to jamming, spoofing (e.g., providing false signals or information to impede determining a position fix), interference, and other disruption (malicious or unintended) which can easily compromise the integrity of the signals reaching a GNSS receiver or the positioning output generated by a GNSS receiver. In a world of increasingly crowded broadcast frequency spectrum and increasingly sophisticated and ambitious hackers, such compromises to the integrity of GNSS signals are very likely to increase. This may lead to GNSS receivers failing to track satellites, or in the case of spoofing or weak jamming may lead to GNSS receivers providing incorrect positioning output.

Typically, a high powered jammer, spoofer or the like would quickly be noticed and discovered. However, due to the very weak nature of GNSS signals arriving at or near earth level from space, a low-powered jammer, spoofer, or the like (malicious or otherwise), may be very localized and hard to detect and/or locate. This can be a particularly insidious problem if the localized region affects a GNSS reference station that broadcasts corrections for use by GNSS receivers in a wider geographic region that surrounds the reference station. This is because such reference stations are often utilized for precise navigation of ships near harbors, precise navigation of aircraft, or precise survey work. Thus, a disruption to the integrity of GNSS signals received by a GNSS reference station may lead to many catastrophic or disruptive problems such as, but not limited to: ships running aground, aircraft crashing, and construction crews being unable to perform work, or performing their work incorrectly in the case of spoofing.

SUMMARY

In a method of Global Navigation Satellite System (GNSS) reference station integrity monitoring, network Real Time Kinematic (RTK) information is accessed for a location associated with a GNSS reference station. At least one aspect of GNSS information local to the location of the GNSS reference station is compared with a corresponding aspect of the network RTK information. The results of the comparing are monitored for indication of occurrence of compromise to operational integrity of the GNSS reference station:

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "accessing," "comparing," "monitoring," "providing," "utilizing," "performing," "adjusting," "generating," "notifying," "transmitting," "communicating," or the like, refer to the actions and processes of a computer system or similar electronic computing device (or portion thereof) such as, but not limited to: a GNSS reference station and/or a network RTK system (or portion thereof). The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

Overview of Discussion

Example techniques, devices, systems, and methods for monitoring the operational integrity and/or assuring operational integrity of a GNSS reference station are described herein. Discussion begins with a high level description of signals from GNSS satellite systems and high level discussion of both Real Time Kinematic (RTK) and network RTK. An example network RTK system is then described. Discussion continues with description of an example GNSS reference station. Components of a GNSS reference station integrity system are then described. Operation of the GNSS reference station integrity system is then further described in conjunction with description of an example method of GNSS reference station integrity monitoring and with description of an example method of GNSS reference station integrity assurance. Finally, an example computer system is described, with which or upon which various components and methods (or portions thereof) may be implemented.

Global Navigation Satellite Systems

A Global Navigation Satellite System (GNSS) is a navigation system that makes use of a constellation of satellites orbiting the earth to provide signals to a receiver that estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, and the GALILEO system currently being deployed by the European Union (EU). A GNSS receiver utilizes signals from satellites of one or more of such satellite systems in producing positioning and navigation output.

With respect to GPS, each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the Unites States Department of Defense (DoD). One signal is transmitted on L2, intended only for DoD-authorized users. Each GPS signal has a carrier at the L1 and L2 frequencies, a pseudo-random number (PRN) code, and satellite navigation data. Two different PRN codes are transmitted by each satellite: a coarse acquisition (C/A) code and a precision (P/Y) code which is encrypted for use by authorized users. A GPS receiver designed for precision positioning contains multiple channels, each of which can track the signals on both L1 and L2 frequencies from a GPS satellite in view above the horizon at the receiver antenna, and from these computes the observables for that satellite comprising the L1 pseudorange, possibly the L2 pseudorange and the coherent L1 and L2 carrier phases. Coherent phase tracking implies that the carrier phases from two channels assigned to the same satellite and frequency will differ only by an integer number of cycles.

With respect to GLONASS, each GLONASS satellite transmits continuously using two radio frequency bands in the L-band, also referred to as L1 and L2. Each satellite transmits on one of multiple frequencies within the L1 and L2 bands respectively centered at frequencies of 1602.0 MHz and 1246.0 MHz. The code and carrier signal structure is similar to that of NAVSTAR. A GNSS receiver designed for precision positioning contains multiple channels each of which can track the signals from both GPS and GLONASS satellites on their respective L1 and L2 frequencies, and generate pseudorange and carrier phase observables from these.

GNSS Positioning

Generally, for determining its position, a GNSS receiver first determines distances to a plurality of GNSS satellites. Each individual distance measurement made by the receiver to a satellite located in a known orbit position traces the receiver on the surface of a spherical shell at the measured distance from the satellite. By taking several such measurements and determining an intersecting point of the spherical shells, a position fix can be generated. The distance measurements to the satellites are based on a time of flight measurement of positioning signals transmitted by the satellites to the receiver and thus the measurements depend on an exact timing. Normally, three distance measurements to three known satellite positions are sufficient to resolve a receiver position in space, however, with time being the fourth unknown in the equations, measurements on four satellites are needed to determine the position of the receiver.

The orbit position of the satellite may be determined based on a data message superimposed on a code that serves as a timing reference. The receiver can compare the time of broadcast at the satellite encoded in the transmission with the time of reception measured by an internal clock at the receiver, thereby measuring the time of flight to the satellite. Some GNSS systems provide satellites that transmit a code with a timing reference, enabling a receiver to compare a successively delayed internal replica of this code with the received code from the satellite, and, when determining a match of the codes, to determine the amount of delay. This type of code based positioning allows accuracies within several meters.

However, various error sources, affect the estimates of absolute positioning accuracy that are made by a GNSS receiver. As noted above, the exact time of flight of the signal from the satellite to the receiver station must be measured, which may be in the range of e.g., 0.06 seconds from a satellite directly above a receiver. In order to make the time measurements as accurate as possible, GNSS satellites generally include several atomic clocks providing a highly accurate time reference. However, even atomic clocks suffer from a certain time error that constitutes an error source in the measurements that has to be observed when desiring centimeter level accuracy. Other error sources deteriorate the positioning result, including propagations delays introduced by the troposphere and ionosphere, orbit errors in the satellite positions, multipath signal distortion, and relativistic effects, as known in the art.

To improve the accuracy of the estimation, systems for example performing a positioning based on carrier phase measurements (such as RTK) often provide reference data from another source to a receiver or rover station, e.g., via ground based radio transmission, in order to enable the receiver or rover station to eliminate the positioning errors introduced by the error sources. One of the most accurate known methods uses relative GNSS carrier phase interferometery between the GNSS rover receiver and GNSS reference receiver antennas plus resolution of integer wavelength ambiguities in the differential phases to achieve centimeter-level positioning accuracies. For example, a reference station with its exact position known may be used to eliminate errors in the measurements taken by a rover station, if in the approximate same geographical region. Measurements made at the reference station can then be transmitted from the reference station to the rover station and used thereat to eliminate the errors in the position determining process. For example, if it is assumed that the errors in the receiver measurements and reference station measurements are the same, the rover station may eliminate the errors by determining a difference between the measurement at the receiver and at the reference station.

These differential GNSS methods are predicated on the near exact correlation of several common errors in the rover and reference observables. They include ionosphere and troposphere signal delay errors, satellite orbit and clock errors, and receiver clock errors. When using differential GNSS methods and reference station data to supplement over-the-air signals, a rover receiver experiences advantages of improved position determination results and thus facilitates applications requiring very high accuracy. However, the tradeoff is that the positioning accuracy of the rover receiver now relies on the permanent availability and integrity of the reference data from the reference station.

Real-Time Kinematic

For higher accuracies Real-Time Kinematic (RTK) positioning is one known differential GNSS technique. RTK positioning employs measurements on a carrier phase of the positioning signals from the satellites. In RTK it is not a code that is compared with a delayed internal version of the code, but the carrier itself is used in the comparison process. By using the phase of the carrier signal from the satellite centimeter accuracy positioning can be achieved.

Kinematic ambiguity resolution (KAR) satellite navigation is a technique used in numerous applications requiring high position accuracy. KAR is based on the use of carrier phase measurements of satellite positioning system signals, where a single reference station provides the real-time corrections with high accuracy. KAR combines the L1 and L2 carrier phases from the rover and reference receivers so as to establish a relative phase interferometry position of the rover antenna with respect to the reference antenna. A coherent L1 or L2 carrier phase observable can be represented as a precise pseudorange scaled by the carrier wavelength and biased by an integer number of unknown cycles known as cycle ambiguities. Differential combinations of carrier phases from the rover and reference receivers result in the cancellation of all common mode range errors except the integer ambiguities. An ambiguity resolution algorithm uses redundant carrier phase observables from the rover and reference receivers, and the known reference antenna position, to estimate and thereby resolve these ambiguities.

Once the integer cycle ambiguities are known, the rover receiver can compute its antenna position with accuracies generally on the order of a few centimeters, provided that the rover and reference antennas are typically not separated by more than 10 kilometers, although similar accuracy can be achieved at greater distances. This method of precise positioning performed in real-time is commonly referred to as real-time kinematic (RTK) positioning.

The reason for the rover-reference separation constraint is that KAR positioning relies on near exact correlation of atmospheric signal delay errors between the rover and reference receiver observables, so that they cancel in the rover-reference observables combinations (for example, differences between rover and reference observables per satellite). The largest error in carrier-phase positioning solutions is introduced by the ionosphere, a layer of charged gases surrounding the earth. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatio-temporal correlations of the ionosphere and troposphere to correct for these non-geometric influences.

When the baseline length between the mobile platform and the reference receiver does not exceed 10 kilometers, which is normally considered a short baseline condition, the ionosphere and troposphere signal delay errors in the observables from the rover and reference receivers are almost exactly the same. These atmospheric delay errors therefore cancel in the rover-reference differential GNSS observables, and the carrier phase ambiguity resolution process required for achieving centimeter-level relative positioning accuracy is not perturbed by them. If the baseline length increases beyond 10 kilometers (considered a long baseline condition), these errors at the rover and reference receiver antennas become increasingly different or de-correlated, so that their presence in the rover-reference differential GNSS observables and their influence on the ambiguity resolution process increases. Ambiguity resolution on single rover-reference receiver baselines beyond 10 kilometers becomes increasingly unreliable. This attribute limits the precise resolution of a mobile platform with respect to a single reference receiver, and essentially makes it unusable on a mobile mapping platform that covers large distances as part of its mission, such as a ship or an aircraft. However, under some conditions reliable resolution of ambiguity at ranges beyond 10 kilometers can be achieved. For such platforms and for many other applications, network RTK can be utilized to improve precision positioning.

Network Real-Time Kinematic

A network RTK system computes the estimated position of a rover receiver using reference observables from three or more reference receivers that approximately surround the rover receiver or its trajectory. This implies that the rover receiver trajectory is mostly contained by a closed polygon whose vertices are the reference receiver antennas. The rover receiver can move a few kilometers outside this polygon without significant loss of positioning accuracy. A network GNSS algorithm calibrates the ionosphere and troposphere signal delays at each reference receiver position and then interpolates and possibly extrapolates these to the rover position to achieve better signal delay cancellation on long baselines than could be had with a single reference receiver. Various methods of signal processing can be used, however they all yield essentially the same performance improvement on long baselines.

Network GNSS method and systems such as network RTK using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. Network KAR algorithms combine the pseudorange and carrier phase observables from the reference receivers as well as their known positions to compute calibrated spatial and temporal models of the ionosphere and troposphere signal delays over the project area. These calibrated models provide corrections to the observables from the rover receiver, so that the rover receiver can perform reliable ambiguity resolution on combinations of carrier phase observables from the rover and some or all reference receivers. The number of reference receivers required to instrument a large project area is significantly less than what would be required to compute reliable single baseline KAR solutions at any point in the project area. See, for example, U.S. Pat. No. 5,477,458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 2003-2004) for a comparison of different network GNSS implementations and comparisons of their respective performances.

A virtual reference station (VRS) network method is a particular implementation of a network RTK method that is characterized by the method by which it computes corrective data for the purpose of rover position accuracy improvement. A VRS network method comprises a VRS corrections generator and a single-baseline differential GNSS position generator such as a GNSS receiver with differential GNSS capability. The VRS corrections generator has as input data the pseudorange and carrier phase observables on two or more frequencies from N reference receivers, each tracking signals from M GNSS satellites. The VRS corrections generator outputs a single set of M pseudorange and carrier phase observables that appear to originate from a virtual reference receiver at a specified position (hereafter called the VRS position) within the boundaries of the network defined by a polygon (or projected polygon) having all or some of the N reference receivers as vertices. The dominant observables errors comprising a receiver clock error, satellite clock errors, ionosphere and troposphere signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., Global Positioning System: Theory and Practice, 5th Edition, 2001, gives comprehensive descriptions of different methods of differential GNSS position computation, ranging in accuracies from one meter to a few centimeters. The single-baseline differential GNSS position algorithm typically computes differences between the rover and reference receiver observables to cancel atmospheric delay errors and other common mode errors such as orbital and satellite clock errors. The VRS position is usually specified to be close to or the same as the roving receiver's estimated position so that the actual atmospheric errors in the roving receiver's observables approximately cancel the estimated atmospheric errors in the VRS observables in the rover-reference observables differences.

The VRS corrections generator computes the synthetic observables at each sampling epoch (typically once per second) from the geometric ranges between the VRS position and the M satellite positions as computed using well-known algorithms such as given in "Naystar GPS Space Segment/Navigation User Interface," ICD-GPS-200C-005R1, Jan. 14, 2003 (hereinafter "ICD-GPS-200"). It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real-time requires each GNSS reference receiver to transmit its observables to a network server computer that computes and transmits the corrections and other relevant data to the GNSS rover receiver. The GNSS reference receivers, plus hardware to assemble and broadcast observables, are typically designed for this purpose and are installed specifically for the purpose of implementing the network. Consequently, those receivers are called dedicated (network) reference receivers.

An example of a VRS network is designed and manufactured by Trimble Navigation Limited, of Sunnyvale, Calif. The VRS network as delivered by Trimble includes a number of dedicated reference stations, a VRS server, multiple server-reference receiver bi-directional communication channels, and multiple server-rover bi-directional data communication channels. Each server-rover bi-directional communication channel serves one rover. The reference stations provide their observables to the VRS server via the server-reference receiver bi-directional communication channels. These channels can be implemented by a public network such as the Internet. The bi-directional server-rover communication channels can be radio modems or cellular telephone links, depending on the location of the server with respect to the rover.

The VRS server combines the observables from the dedicated reference receivers to compute a set of synthetic observables at the VRS position and broadcasts these plus the VRS position in a standard differential GNSS (DGNSS) message format, such as one of the RTCM (Radio Technical Commission for Maritime Services) formats, an RTCA (Radio Technical Commission for Aeronautics) format or a proprietary format such as the CMR (Compact Measurement Report) or CMR+ format which are messaging system communication formats employed by Trimble Navigation Limited. Descriptions for numerous of such formats are widely available. For example, RTCM Standard 10403.1 for DGNSS Services—Version 3, published Oct. 26, 2006 (and Amendment 2 to the same, published Aug. 31, 2007) is available from the Radio Technical Commission for Maritime Services, 1800 N. Kent St., Suite 1060, Arlington, Va. 22209. The synthetic observables are the observables that a reference receiver located at the VRS position would measure. The VRS position is selected to be close to the rover's estimated position so that the rover-VRS separation is less than a maximum separation considered acceptable for the application. Consequently, the rover receiver must periodically transmit its approximate position to the VRS server. The main reason for this particular implementation of a real-time network RTK system is compatibility with RTK survey GNSS receivers that are designed to operate with a single reference receiver.

Although a VRS network has been described as a particular example of a network RTK system, numerous different types and variations of network RTK systems are known. Some non-limiting examples of network RTK methods include: VRS (Virtual Reference Station); PRS (Psuedo-Reference Station), MAC (Master-Auxiliary Concept), FKP (originating from the German word "Flachenkorrekturparameter" which roughly translates to "area correction parameters), and Compact Network RTK. It is appreciated that embodiments of the inventions described herein are not limited to use with a VRS network, and instead are operable with any network RTK method/system including but not limited to those listed above.

Example Network Real-Time Kinematic System

Figure 1A:
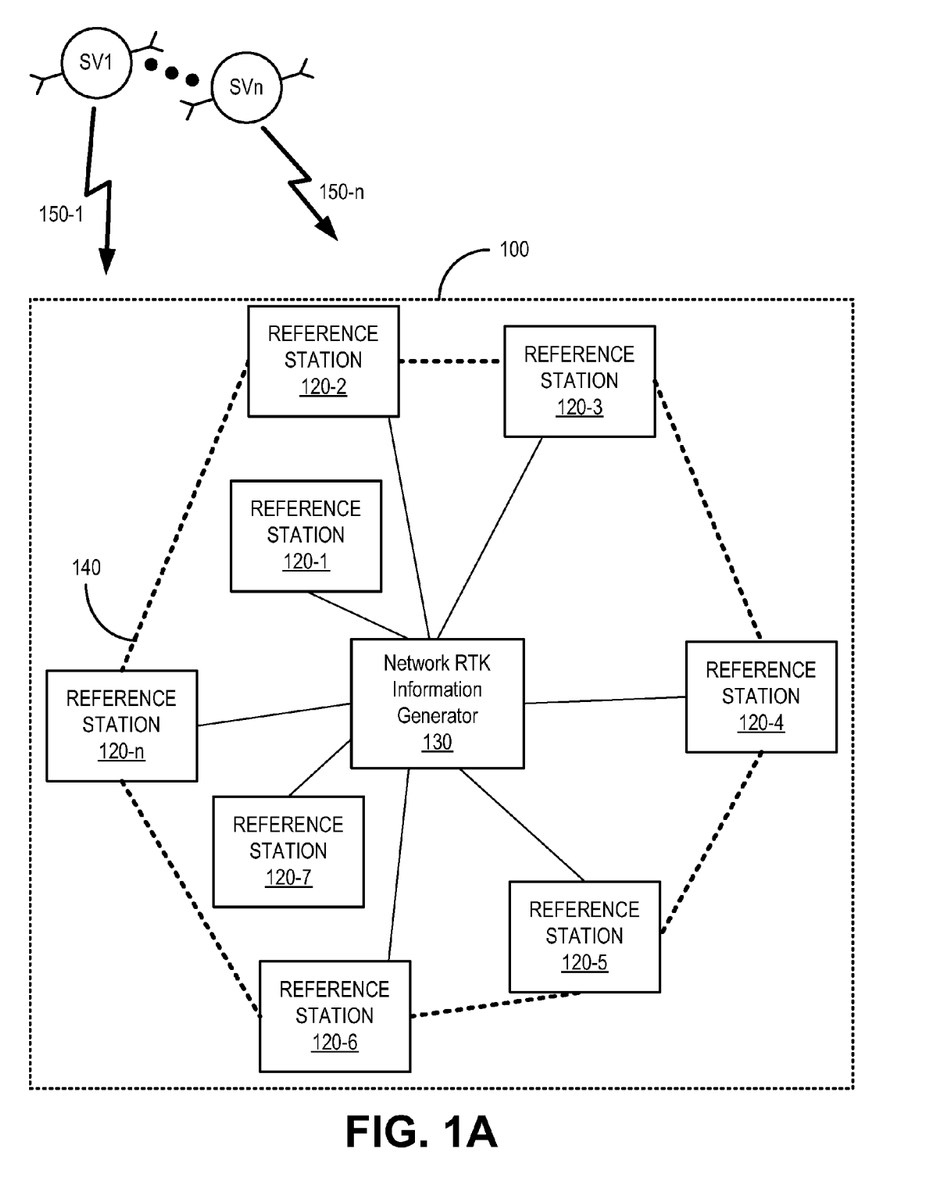
FIG. 1A is a diagram of an example network Real Time Kinematic (RTK) system, in accordance with an embodiment.

FIG. 1A is a diagram of an example network RTK system 100. Network RTK system 100 includes a plurality of GNSS reference stations 120 (120-1 through 120-n) that are spread over a geographic region 140. Each reference station 120 receives GNSS signals 150 (150-1 through 150-n) over-the-air which are broadcast from a plurality of GNSS satellite vehicles SV1-SVn. Individual reference stations 120 (e.g., reference station 120-1) in system 100 locally calculate positioning information from signals 150 and generate Real-Time Kinematic (RTK) corrections specific to their respective locations in geographic region 140. Techniques for generating such RTK corrections are well-known in the art and a high level discussion of such techniques has been provided above herein. Additionally, each of reference stations 120-1 though 120-n communicates its observables (raw pseudorange and carrier phase data of signals 150) and in some instances other information such as location specific weather information to network RTK information generator 130.

Network RTK information generator 130 combines the pseudorange and carrier phase observables from the reference stations 120, as well as their known positions, to compute calibrated spatial and temporal models of the ionosphere and troposphere signal delays over geographic region 140. RTK information generator 130 can then output a single set of M pseudorange and carrier phase observables that appear to originate from any specified position within the boundaries of the RTK network (e.g., over geographic region 140 in the example of FIG. 1A). This output is referred to herein as "network RTK information" and may include, among other items, dominant observables errors comprising a receiver clock error, satellite clock errors, ionosphere and troposphere signal delay errors and noise all appear to be consistent with the specified position. RTK information generator 130 combines the observables from the dedicated reference stations to compute a set of synthetic observables at the specified position and broadcasts or otherwise provides these synthetic observables plus the specified position in a message.

Figure 1B:
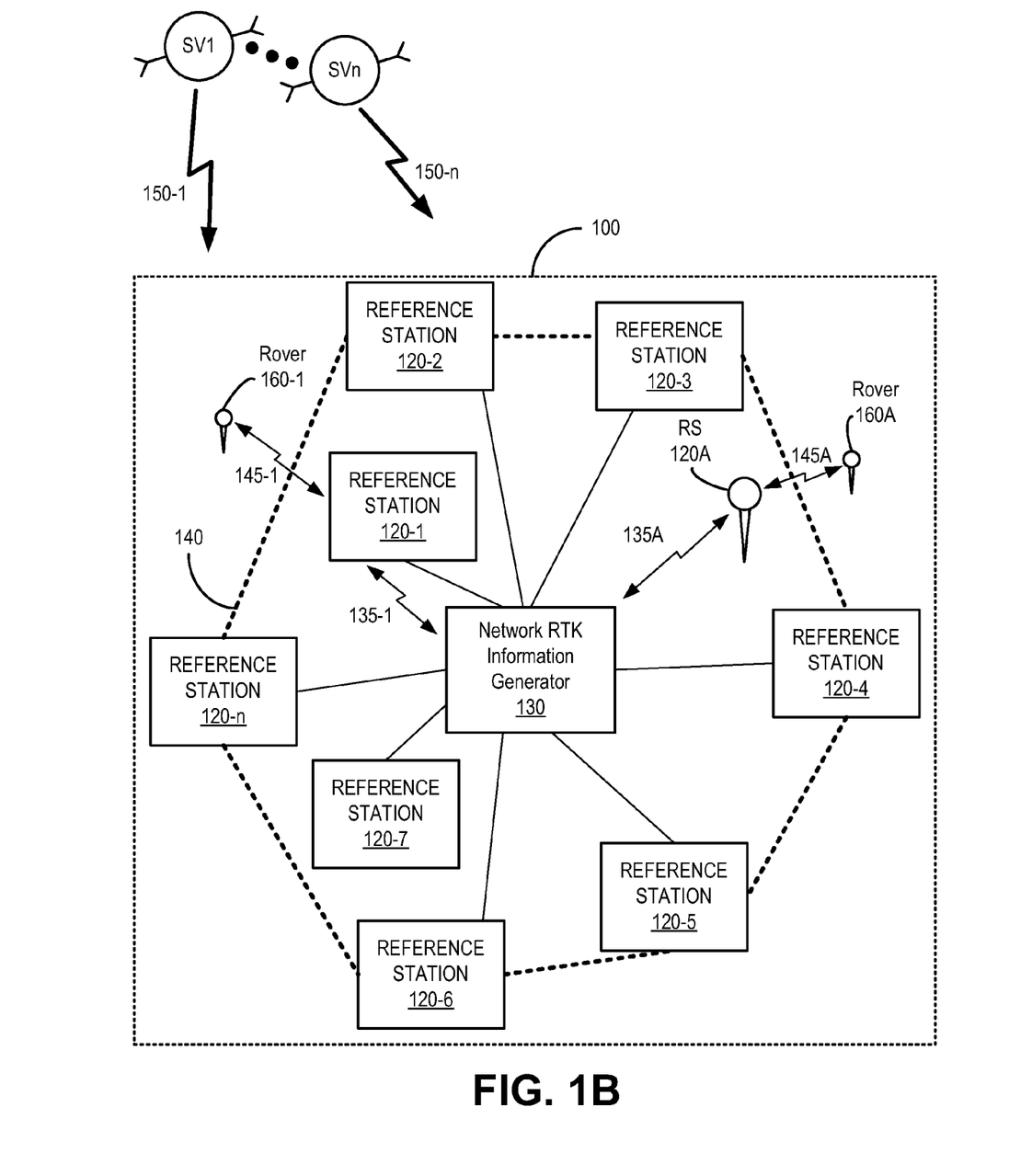
FIG. 1B illustrates an additional reference station, along with rovers, located in the geographic region encompassed by the network RTK system, according to an embodiment.

FIG. 1B illustrates an additional reference station, RS 120A, that is located in the geographic region 140 encompassed by the network RTK system, according to an embodiment. RS 120a is not a part of system 100, but may receive network RTK information 135A (e.g., synthetic observables and/or other information) from network RTK information generator 130 that is specified for and specific to the location of RS 120a. Similarly, network RTK information generator 130 may generate network RTK information for any other specified location within geographic region 140. For example, in one embodiment, network RTK information generator 130 generates network RTK information 135-1 which includes synthetic observables for the location of reference station 120-1. Such network RTK information 135 can be generated for the location of any of reference stations 120-1 to 120-n. Synthetic observables are synthetic versions of signals from GNSS satellites that would be receivable at the specified location at a particular time (e.g., the current or "real time").

In one embodiment, the synthetic observables include the broadcast satellite orbit information (ephemeris) that would be received over-the-air from GNSS satellites. Additionally or alternatively in one embodiment, network RTK information 135 is generated to include precise orbit information for the orbits of GNSS satellites. Such precise orbit information may be provided as Keplarian elements for a particular GNSS satellite or in another format. It is appreciated that many sources of such precise orbit information are known and may be utilized by RTK information generator 130 to either access or generate precise orbit information.

In one embodiment, when RTK information generator 130 generates synthetic observables for a specified location that corresponds with the location of one of its member reference stations (e.g., reference station 120-1), the observables from that particular reference station are dropped out group of reference station observables that are utilized to calculate the synthetic observables. In one such embodiment, the orbit information that is provided as part of the network RTK information may simply be a copy of the observed orbit information that has been reported from another reference station (e.g., reference station 120-5). This is possible because broadcast orbit information remains static for periods of time and is identically received at other locations.

FIG. 1B also illustrates that a reference station 120 can generate corrections for a rover GNSS receiver in its vicinity. For example, reference station 120-1 generates RTK corrections 145-1 for rover receiver 160-1. Similarly, reference station 120a generates RTK corrections 145A for rover receiver 160A. As will be described herein, reference stations 120 are configured to generate such corrections either using either over-the-air signals received from GNSS satellites or from synthetic observables for their specified locations that are generated by network RTK information generator 130.

Example GNSS Reference Station

Figure 2:
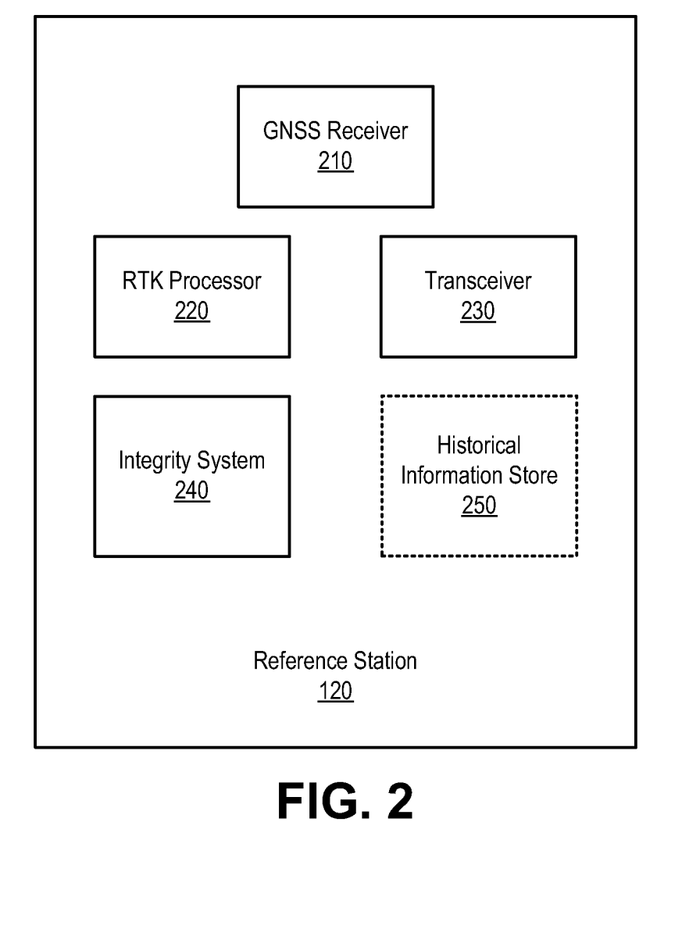
FIG. 2 is a block diagram of an example GNSS reference station, in accordance with an embodiment.

FIG. 2 is a block diagram of an example GNSS reference station 120, in accordance with an embodiment. It is appreciated that GNSS reference station 120 may represent any of reference stations 120 that are illustrated in FIGS. 1A and 1B. In one embodiment, reference station 120 includes one or more GNSS receivers 210, an RTK processor 220, a transceiver 230, and an integrity system 240. In one embodiment reference station 120 may also include additional components such as historical information store 250.

GNSS receiver 210 operates in the manner previously described herein to calculate the position of reference station 120 using signals received from a plurality of GNSS satellites. Alternatively, in some embodiments, GNSS receiver 210 is capable of operating on synthetic GNSS information that is provided as part of network RTK information.

RTK processor 220 performs a method of RTK positioning to generate corrections based upon a known location of reference station 120 and the signals received and position determined by GNSS receiver 210.

Transceiver 230 communicates information between reference station 120 and network RTK information generator 130. This facilitates communication of observed signals from reference station 120 to network RTK information generator 130 and/or facilitates reference station 120 accessing network RTK information from network RTK information generator 130. In one embodiment, transceiver 230 also broadcasts and/or communicates with rover receiver(s) in the vicinity of a particular reference station. This facilitates communicating RTK corrections from a reference station to a rover receiver. As will be further discussed, in one embodiment, transceiver 230 also communicates a compromise notification to a user of reference station 120 in the event that the operational integrity of reference station 120 is compromised. This can include transmitting such a message to a rover receiver, to another reference station, and/or to network RTK information generator 130.

Integrity system 240 monitors the operational integrity of reference station 120. This can include monitoring the received GNSS satellite signals for signs of spoofing, jamming, or other malicious or unintentional interference that compromises the integrity of the signals or the output of reference station 120 that is generated from such signals. In one embodiment, integrity system 240 additionally takes action to ensure the operational integrity of reference station 120, such as by causing a compromise notification to be sent to a user when a compromise to operational integrity is monitored or by causing reference station 120 (e.g., GNSS receiver 210 and/or RTK processor 220) to switch over to the use of network RTK information (synthetic signals) when over-the-air signals are deemed to have had their integrity compromised. Operation of integrity system 240 is further described in conjunction with FIGS. 3, 4, and 5.

Historical information store 250, when included, is a storage (e.g., a database stored upon a hard disk drive or in a computer memory) of historical information that is specific to the location of a particular reference station. This historical information includes information regarding over-the-air satellite signal strength/performance as experienced by the reference station in various settings or combinations of settings. Some non-limiting examples include signal strength/performance measured at the reference station over various conditions or combinations of conditions such as: solar cycles, atmospheric conditions, weather conditions (e.g., temperature, humidity, and precipitation), day-of-year, time-of-day, and/or orbital position of a particular GNSS satellite relative to the reference station. Although depicted as being stored at reference station 120, such historical information may be stored elsewhere and accessible by reference station 120 or other entity.

Example GNSS Reference Station Integrity System

Figure 3:
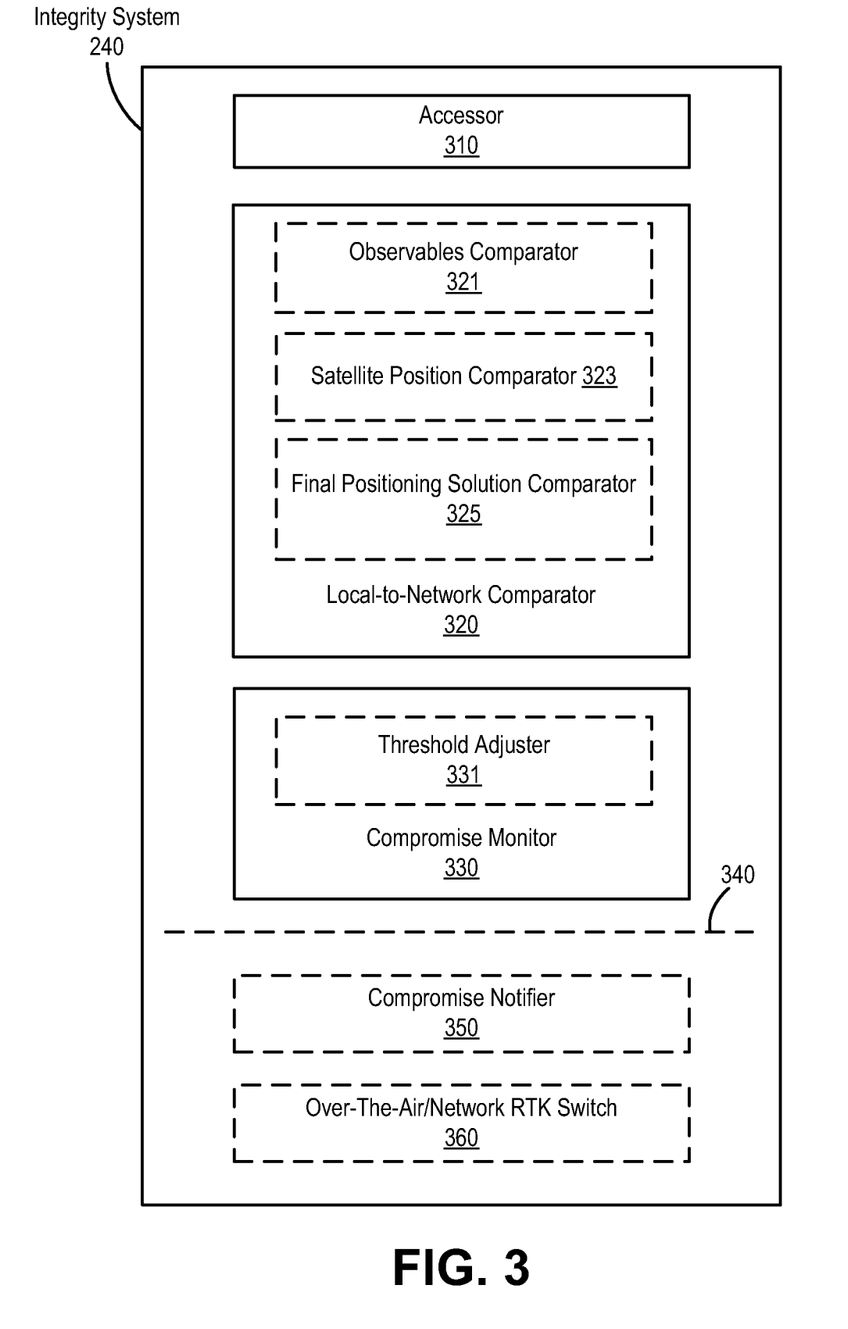
FIG. 3 is a block diagram of an example Global Navigation Satellite System (GNSS) reference station integrity system, in accordance with one or more embodiments.

FIG. 3 is a block diagram of an example Global Navigation Satellite System (GNSS) reference station "integrity system" 240, in accordance with one or more embodiments. In one embodiment, integrity system includes one or more of accessor 310, local-to-network "comparator" 320 and compromise monitor 330. In some embodiments, integrity system 240 further includes one or more of compromise notifier 350 and over-the-air/network RTK "switch" 360. The components of integrity system 240 communicate with one another as required in the performance of integrity monitoring and assurance for a reference station. The components of integrity system 240 may be implemented in one or more of hardware, a combination of hardware and software, and a combination of hardware and firmware.

Although depicted as a stand alone system, in some embodiments, integrity system 240 may be implemented as a distributed system with some components located in differing locations. For example, in one embodiment, components above dashed line 340 may be located at a network RTK information generator (e.g., network RTK information generator 130) while components below dashed line 340 are located at a reference station 120. Other combinations of component locations for integrity system 240 are possible, such as having all components located at a reference station 120 or all components located at another location such as at network RTK information generator 130.

Accessor 310 accesses network RTK information for the specified location of a GNSS reference station 120. This can comprise requesting, receiving, or retrieving this network RTK information. For example, in one embodiment, when accessor 310 is included in reference station 120-1 accessor 310 accesses network RTK information from network RTK information generator 130 and specifies that the accessed information is for the location of GNSS reference station 120-1.

Comparator 320 compares at least one aspect of GNSS information local to a location of a GNSS reference station (e.g., from signals received locally over-the-air from GNSS satellites) with a corresponding aspect of network RTK information that has been generated for location of the reference station. This presupposes that the location of the reference station is within a geographic area encompassed by the network RTK information.

In one embodiment, comparator 320 includes observables comparator 321 which compares one or more aspects of the actual observables with the synthetic observables of the network RTK information. This can include comparing timing signals, delay, code from the signals, and change in carrier frequency (over time) of the actual and synthetic signals. For example, with respect to carrier frequency observables GNSS receiver 210 (see FIG. 2) measures a fractional phase of a carrier that is received by GNSS receiver 210 when it first receives a signal. GNSS receiver 210 then measures the number of cycles that are received. When the carrier is first measured, the GNSS receiver 210 does not know how many whole carrier cycles are between it and the satellite. From the initial point to the next epoch it knows how many cycles have been received and the ambiguity remains the same. The key is that network RTK information for a location of a reference station 120 should have a fractional phase fairly similar to the observed fractional phase at a GNSS receiver 210 of the reference station. However, from one measurement to the next, the change in carrier should be the same in the observables and in the synthetic (within the uncertainty of the ionospheric and tropospheric model used in the generating the synthetic observables versus reality, as well as other variables which are not modeled such as multipath induced uncertainties). Observables comparator 321 compares the change in carrier frequency from one measurement to the next to determine if they agree, or if not, to determine by how much they disagree. In one embodiment, timing data can be used to determine whether a GNSS receiver (e.g., of reference stations 120-1-120-n, or rover 160-1-160A) is receiving a compromised signal. For example, some locations, such as cellular telephone towers, use GNSS timing signals for timing information. In one embodiment, the timing signals of GNSS receivers at one or more reference stations 120-1-120-n, and/or rovers 160-1-160A, can be compared to determine whether signals from orbiting GNSS satellites are being jammed or spoofed. This information can be used by observables comparator 321 to determine whether the timing signals agree, or if not, to determine by how much they disagree.

In one embodiment, comparator 320 includes satellite position comparator 323 which compares the actual received satellite positions (or orbits calculated therefrom) with the over-the-air orbit information/precise orbit information (or orbits calculated therefrom) that is received in the accessed network RTK information. This can comprise comparing the raw broadcast orbits received via over-the-air GNSS signals with the version of the raw broadcast orbit (or precise orbit) that is received in the network RTK information. If there is no compromise to integrity of the over-the-air satellite signals or to the operation of the GNSS receiver(s) at a reference station 120, compared raw broadcast orbits (and satellite positions generated therefrom) from the reference station and the network RTK information should typically agree exactly while a raw broadcast orbit from the reference station and a precise broadcast orbit from the network RTK information (or satellite positions calculated therefrom) should very closely agree when compared.

In one embodiment, comparator 320 includes final positioning solution comparator 325 which compares a final positioning solution generated from the over-the-air satellite signals with a final positioning solution generated from the synthetic observables and other information received in the network RTK information. Typically, if there is no compromise to the integrity of-the-over-the-air satellite signals or to the operation of the GNSS receiver(s) at a reference station 120, the final positioning solutions should very closely agree when compared.

Compromise monitor 330 monitors results of the comparison(s) that is/are performed by comparator 320. Compromise monitor 330 monitors for any indication of occurrence of compromise to operational integrity of the GNSS reference station which can include compromises to the integrity of received GNSS satellite signals or compromises to the integrity of the results (output) that reference station 120 generates from the received GNSS satellite signals. It is appreciated that some comparisons should agree exactly (the threshold for disagreement is zero), or else compromise monitor 330 will indicate that an integrity compromise is occurring. In other instances, comparisons should agree within some predefined non-zero threshold of difference. For example, in some embodiments, actual and synthetic final solutions may be allowed to differ by less than a certain amount (e.g., 0.5 cm, 1 cm, 5 cm, or some other amount). Similarly, in some embodiments, calculated satellite position from observable and precise orbits may be allowed to differ by less than some amount, such as 0.1 meters, 0.5 meters, 5 meters, or some other amount. Additionally, in some embodiments, observable and synthetic code may be required to agree exactly. Likewise, in some embodiments, observed and synthetic carrier phase should agree within some certain amount, such as within a predetermined number of degrees from epoch to epoch.

It is appreciated that many conditions may impact the value that is utilized for threshold of agreement, especially the non-zero thresholds. Some examples include conditions such as atmospheric conditions, weather, time-of-day, day-of-year, solar cycles, multipath uncertainties, and the like. In one embodiment, compromise monitor includes threshold adjuster 331 which relies on actual historical signal information to determine qualities of received signals in various conditions and how these received signals compared to network RTK information. Historical variances can be utilized to loosen or tighten the threshold which compromise monitor 330 utilizes to monitor a comparison result and determine if an integrity compromise has occurred. For example, in conditions of high humidity and temperature signals may propagate a different rates and thresholds may be relaxed slightly.

Compromise notifier 350, when included, operates to generate a comprise notification message when compromise monitor 330 monitors the occurrence of a compromise to the operational integrity of reference station 120. This message is then provided to users of reference station 120. For example, transceiver 230 can transmit the compromise notification message to a rover receiver or to a network RTK information generator 130 to which reference station 120 provides information. This facilitates user awareness of potential problems that may exist with precise positioning applications (such as navigation near hazards).

Over-the-air/network RTK "switch" 360, when included, operates to ensure the operational integrity of a reference station 120. For example, in the event that compromise monitor 330 monitors the occurrence of a compromise to operational integrity of a reference station that is utilizing over-the-air GNSS signals, switch 360 replaces these over-the-air signals with synthetic observables from network RTK information for the location of the reference station. For example, this can comprise switch 360 causing one or both of GNSS receiver 210 and RTK processor 220 to operate utilizing synthetic GNSS information to replace local over-the-air GNSS signals which may have been comprised by spoofing, jamming, or other interference. This allows for continued operation of reference station 120 with little or no degradation and no down time.

Example Methods of Use

Figure 4:
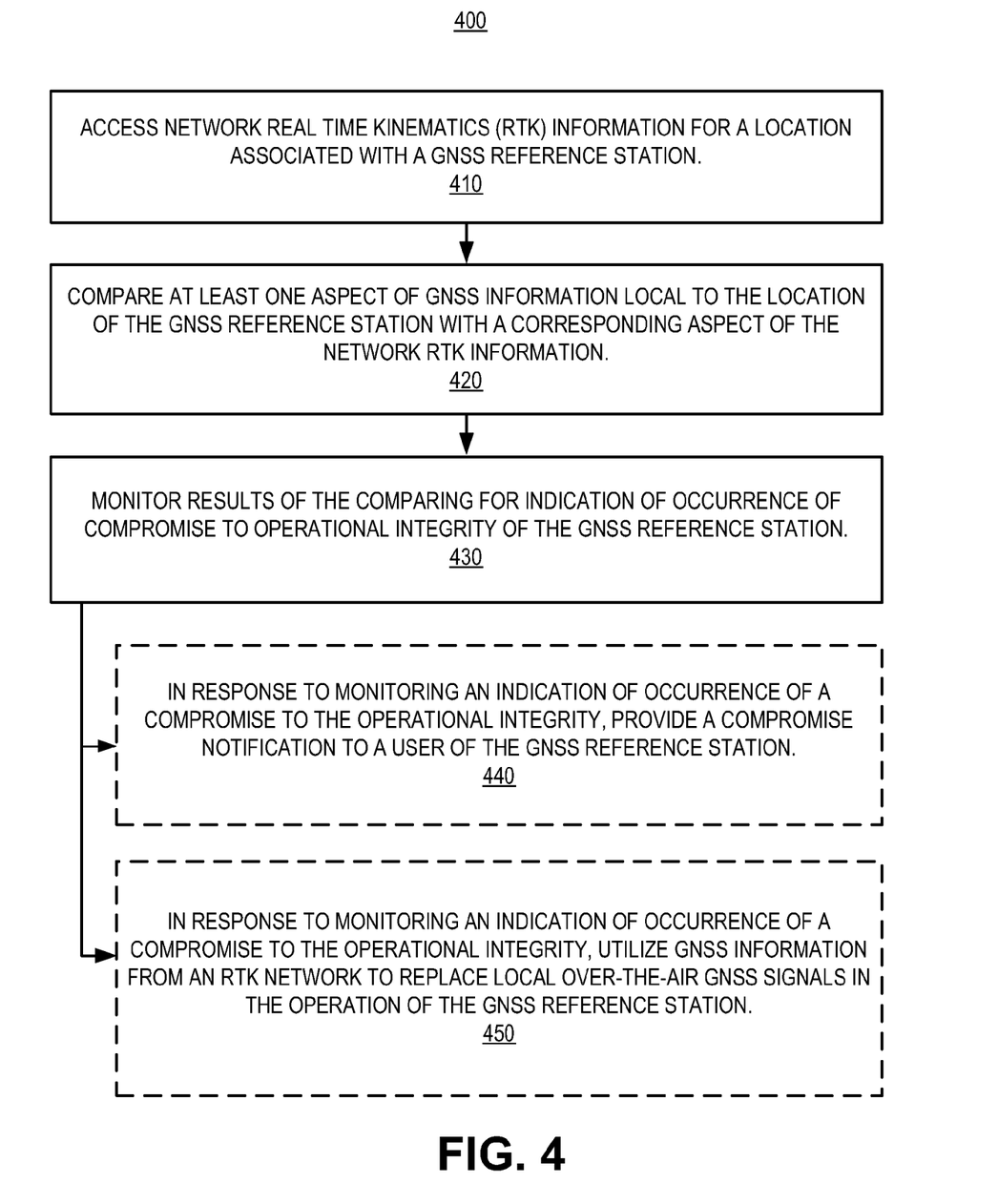
FIG. 4 is a flow diagram of an example method of GNSS reference station integrity monitoring, in accordance with an embodiment.
Figure 5:
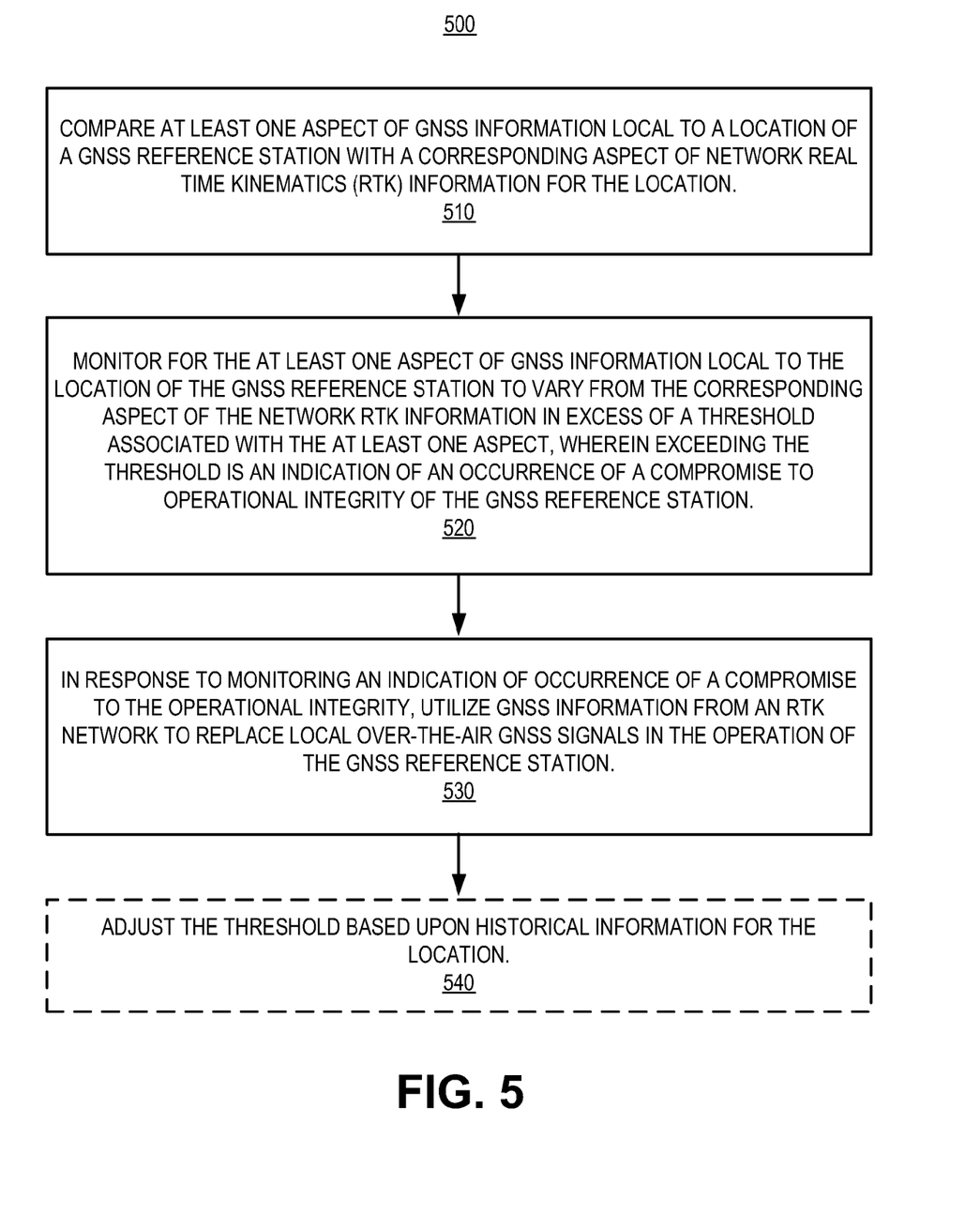
FIG. 5 is a flow diagram of an example method of a method of GNSS reference station integrity assurance, in accordance with an embodiment.

With reference to FIGS. 4 and 5, flow diagrams 400 and 500 illustrate example procedures used by various embodiments. Flow diagrams 400 and 500 include processes and operations that, in various embodiments, are carried out by one or more processors (e.g., processor(s) 606 of FIG. 6) under the control of computer-readable and computer-executable instructions. The computer-readable and computer-executable instructions reside, for example, in tangible data storage features such as volatile memory, non-volatile memory, and/or a data storage unit (see e.g., 608, 610, and 612 of FIG. 6). The computer-readable and computer-executable instructions can also reside on any tangible computer readable media such as a hard disk drive, floppy disk, magnetic tape, Compact Disc, Digital Versatile Disc, and the like. The computer-readable and computer-executable instructions, which may reside on computer readable media, are used to control or operate in conjunction with, for example, one or more components of integrity system 240 and/or and or one or more of processors 606. When executed by a computer system or portion thereof, such as a processor, the computer-readable instructions cause the computer system to perform operations described by the methods of flow diagrams 400 and 500.

Although specific procedures are disclosed in flow diagrams 400 and 500 such procedures are examples. That is, embodiments are well suited to performing various other operations or variations of the operations recited in the processes of flow diagrams 400 and 500. Likewise, in some embodiments, the operations in flow diagrams 400 and 500 may be performed in an order different than presented, not all of the operations described in one or more of these flow diagrams may be performed, and/or one or more additional operation may be added.

Example Method of GNSS Reference Station Integrity Monitoring

FIG. 4 is a flow diagram 400 of an example method of Global Navigation Satellite System (GNSS) reference station integrity monitoring, in accordance with an embodiment.

Reference will be made to elements of FIGS. 1A, 1B, 2, and 3 to facilitate the explanation of the operations of the method of flow diagram 400. In one embodiment, the method of flow diagram 400 describes a use of integrity system 240 in monitoring operational integrity of a reference station 120.

At operation 410, in one embodiment, network Real Time Kinematic (RTK) information is accessed for a location associated with a GNSS reference station. In one embodiment, when such network RTK information is not already available, this comprises accessor 310 requesting, receiving, or retrieving network RTK information from for the location of the GNSS reference station. For example, with reference to FIG. 1B, in one embodiment accessor 310 accesses network RTK information for the location of reference station 120-1 from network RTK information generator 130.

In one embodiment, as a result of the network information being accessed for a reference station 120 that participates in a network RTK system, the network RTK information that is accessed is generated from inputs provided by a plurality of GNSS reference stations that does not include the GNSS reference station for which the specified the location is associated. For example, with reference again to FIG. 1B, in one embodiment, when accessor 310 accesses network RTK information for the location of reference station 120-1, network RTK information generator 130 generates this network RTK information without using any observables that have been provided by reference station 120-1. In this manner, if the observables provided to network RTK information generator 130 are integrity comprised (e.g., spoofed, garbled, jammed, or flawed in some way), they will have no impact on the network RTK information that is generated for reference station 120-1.

At operation 420, in one embodiment, at least one aspect of GNSS information local to the location of the GNSS reference station is compared with a corresponding aspect of the accessed network RTK information. With reference to the previous example involving reference station 120-1, in one embodiment, comparator 320 compares local GNSS information of reference station 120-1 with network RTK information for the location of reference station 120-1. As described above, this can comprise comparator 320 comparing one or more of observables, satellite positions/orbits, and final positioning solution. In one embodiment, observables comparator 321 can compare one or more local observables of the GNSS reference station 120-1 with corresponding synthetic local observables of the network RTK information for the location of reference station 120-1. In one embodiment, satellite positioning comparator 322 can compare satellite positioning domain information (orbit information and satellite position generated therefrom) that is local to GNSS reference station 120-1 with corresponding satellite positioning domain information of the network RTK information for the location of reference station 120-1. In one embodiment, final positioning solution comparator 325 compares final positioning information generated by GNSS reference station 120-1 using over-the-air GNSS signals with corresponding final positioning solution information generated from or provided within network RTK information for the location of reference station 120-1.

As comparator 320 may be located at a reference station or elsewhere (such as at a network RTK information generator) the comparisons may be performed at the GNSS reference station for which they are being made, or they may be performed at some location that is external and even remote to the GNSS reference station.

At operation 430, in one embodiment, the results of the comparing are monitored for indication of occurrence of compromise to operational integrity of the GNSS reference station. This could indicate a compromise to the integrity of the functioning of one or more components of the reference station or a compromise to the integrity of signals that are being received by the reference station (i.e., the possibility of spoofing or jamming). Continuing the previous example, in one embodiment, compromise monitor 330 monitors for the results of the comparison(s) for indications of an integrity compromise. Depending on the comparison, such indication may be the lack of an exact match or a difference that exceeds a predetermined threshold for the items being compared. As has been previously described herein, in some embodiments threshold adjuster 331 may adjust the tolerance of one or more thresholds based upon recurrence of conditions that are recorded in historical information for the location of a reference station.

As depicted by operation 440, in one embodiment, the method of flow diagram 400 additionally comprises providing a compromise notification to a user of the GNSS reference station in response to monitoring an indication of occurrence of a compromise to the operational integrity. For example, in one embodiment, when compromise monitor 330 monitors a comparison and determines that the result indicates an integrity compromise, to the operation of reference station 120-1, then compromise notifier 350 causes a compromise notification message to be provided for users of reference station 120-1.

As depicted by operation 450, in one embodiment, the method of flow diagram 400 additionally comprises utilizing GNSS information from an RTK network to replace local over-the-air GNSS signals in the operation of the GNSS reference station in response to monitoring an indication of occurrence of a compromise to the operational integrity of the GNSS reference station. For example, in one embodiment, when compromise monitor 330 monitors a comparison and determines that the result indicates an integrity compromise to the operation of reference station 120-1, then switch 360 causes reference station 120-1 to replace over-the-air GNSS signals with synthetic GNSS signals from network RTK information generated for the location of reference station 120-1. This can assure uninterrupted continuous operation of the reference station despite spoofing, jamming, or other malicious or inadvertent disruption of GNSS signals that are being received over-the-air at the reference station.

Example Method of GNSS Reference Station Integrity Assurance

FIG. 5 is a flow diagram 500 of an example method of Global Navigation Satellite System (GNSS) reference station integrity assurance, in accordance with an embodiment. Reference will be made to elements of FIGS. 1A, 1B, 2, and 3 to facilitate the explanation of the operations of the method of flow diagram 500. In one embodiment, the method of flow diagram 500 describes a use or instructions for operation of integrity system 240 in assuring operational integrity of a reference station 120.

At operation 510, in one embodiment, at least one aspect of GNSS information local to a location of a GNSS reference station is compared with a corresponding aspect of network Real Time Kinematic (RTK) information for the location. With reference to the FIG. 1B, in one embodiment, this comprises comparator 320 comparing local GNSS information of reference station 120-1 with network RTK information for the location of reference station 120-1. This can comprise comparator 320 comparing one or more of observables, satellite positions/orbits, and final positioning solution. In one embodiment, observables comparator 321 can compare one or more local observables of GNSS reference station 120-1 with corresponding synthetic local observables of the network RTK information for the location of reference station 120-1. In one embodiment, satellite positioning comparator 322 can compare satellite positioning domain information (orbit information and satellite position generated therefrom) that is local to GNSS reference station 120-1 with corresponding satellite positioning domain information of the network RTK information for the location of reference station 120-1. In one embodiment, final positioning solution comparator 325 compares final positioning information generated by GNSS reference station 120-1 using over-the-air GNSS signals with corresponding final positioning solution information generated from or provided within network RTK information for the location of reference station 120-1.

As comparator 320 may be located at a reference station or elsewhere (such as at a network RTK information generator) the comparisons may be performed at the GNSS reference station for which they are being made, or they may be performed at some location that is external and even remote to the GNSS reference station.

At operation 520, in one embodiment, at least one aspect of GNSS information local to the location of the GNSS reference station monitoring to determine if it varies from the corresponding aspect of the network RTK information in excess of a threshold associated with the at least one aspect. In some instances the threshold may allow small differences in compared aspects while in others the threshold requires exact agreement in compared aspects. Exceeding or busting a threshold is an indication of an occurrence of a compromise to operational integrity of the GNSS reference station. This can mean that there is a problem with the integrity of the GNSS signals being received or a problem with the integrity of the functioning of the reference station. Continuing the previous example, in one embodiment, compromise monitor 330 monitors for the results of the comparison(s) for indications of an integrity compromise. Depending on the comparison, such indication may be the lack of an exact match or a difference that exceeds a predetermined threshold of variation for the items being compared.

At operation 530, in one embodiment, in response to monitoring an indication of occurrence of a compromise to the operational integrity, GNSS information from an RTK network is utilized to replace local over-the-air GNSS signals in the operation of the GNSS reference station. For example, in one embodiment, when compromise monitor 330 monitors a comparison and determines that the result indicates an integrity compromise to the operation of reference station 120-1, then switch 360 causes reference station 120-1 to replace over-the-air GNSS signals with synthetic GNSS signals from network RTK information generated for the location of reference station 120-1. This can assure uninterrupted continuous operation of the reference station despite spoofing, jamming, or other malicious or inadvertent disruption of GNSS signals that are being received over-the-air at the reference station.

At operation 540, in one embodiment, the method of flow diagram 500 additional comprises adjusting a threshold based upon historical information for location of a reference station. As has been previously described herein, in some embodiments threshold adjuster 331 may adjust the tolerance of one or more thresholds based upon recurrence of conditions similar to those that are recorded in historical information for the location of the reference station.

Example Computer System Environment

Figure 6:
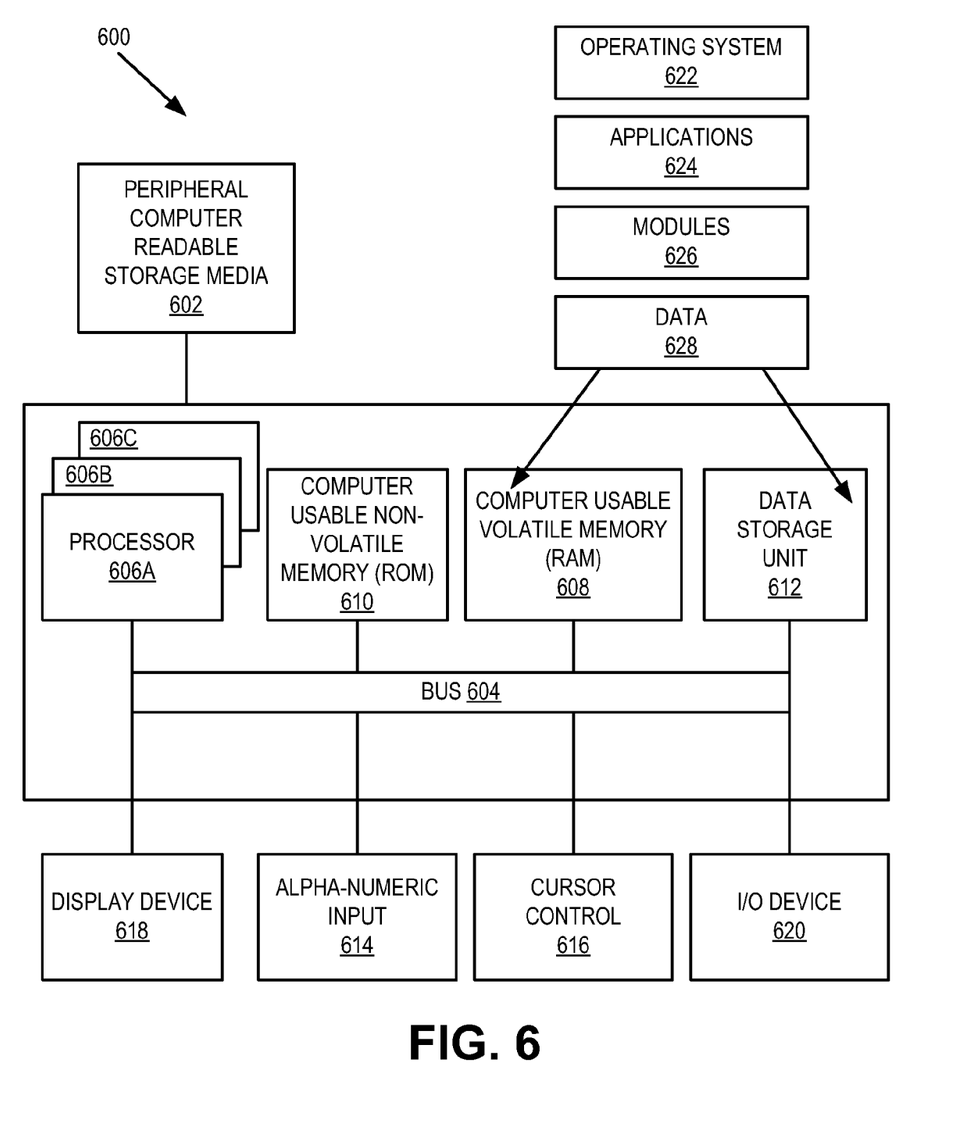
FIG. 6 illustrates a block diagram of an example computer system with which or upon which various embodiments of the present invention may be implemented.

With reference now to FIG. 6, all or portions of some embodiments described herein are composed of computer-readable and computer-executable instructions that reside, for example, in computer-usable/computer-readable storage media of a computer system. That is, FIG. 6 illustrates one example of a type of computer (computer system 600) that can be used in accordance with or to implement various embodiments which are discussed herein. It is appreciated that computer system 600 of FIG. 6 is only an example and that embodiments as described herein can operate on or within a number of different computer systems including, but not limited to, general purpose networked computer systems, embedded computer systems, server devices, client devices, various intermediate devices/nodes, stand alone computer systems, GNSS receivers, GNSS reference stations, portions of a network RTK system, distributed computer systems, and the like. Computer system 600 of FIG. 6 is well adapted to having peripheral computer-readable storage media 602 such as, for example, a floppy disk, a compact disc, digital versatile disc, universal serial bus "thumb" drive, removable memory card, and the like coupled thereto.

System 600 of FIG. 6 includes an address/data bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g., random access memory (RAM), coupled to bus 604 for storing information and instructions for processors 606A, 606B, and 606C. System 600 also includes computer usable non-volatile memory 610, e.g., read only memory (ROM), coupled to bus 604 for storing static information and instructions for processors 606A, 606B, and 606C. Also present in system 600 is a data storage unit 612 (e.g., a magnetic or optical disk and disk drive) coupled to bus 604 for storing information and instructions. System 600 also includes an optional alphanumeric input device 614 including alphanumeric and function keys coupled to bus 604 for communicating information and command selections to processor 606A or processors 606A, 606B, and 606C. System 600 also includes an optional cursor control device 616 coupled to bus 604 for communicating user input information and command selections to processor 606A or processors 606A, 606B, and 606C. In one embodiment, system 600 also includes an optional display device 618 coupled to bus 604 for displaying information.

Referring still to FIG. 6, optional display device 618 of FIG. 6 may be a liquid crystal device, cathode ray tube, plasma display device or other display device suitable for creating graphic images and alphanumeric characters recognizable to a user. Optional cursor control device 616 allows the computer user to dynamically signal the movement of a visible symbol (cursor) on a display screen of display device 618 and indicate user selections of selectable items displayed on display device 618. Many implementations of cursor control device 616 are known in the art including a trackball, mouse, touch pad, joystick or special keys on alphanumeric input device 614 capable of signaling movement of a given direction or manner of displacement. Alternatively, it will be appreciated that a cursor can be directed and/or activated via input from alphanumeric input device 614 using special keys and key sequence commands. System 600 is also well suited to having a cursor directed by other means such as, for example, voice commands System 600 also includes an I/O device 620 for coupling system 600 with external entities. For example, in one embodiment, I/O device 620 is a modem for enabling wired or wireless communications between system 600 and an external network such as, but not limited to, the Internet.

Referring still to FIG. 6, various other components are depicted for system 600. Specifically, when present, an operating system 622, applications 624, modules 626, and data 628 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations within RAM 608, computer-readable storage media within data storage unit 612, peripheral computer-readable storage media 602, and/or other tangible computer-readable storage media.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated.

What is claimed is:

1. A method of Global Navigation Satellite System (GNSS) reference station integrity monitoring, said method comprising:
    accessing GNSS reference station network Real Time Kinematic (RTK) information wherein said GNSS reference station network RTK information is used to derive the location of said GNSS reference station;
    comparing at least one aspect of GNSS information generated local to said location of said GNSS reference station and used for deriving said location of said GNSS reference station with a corresponding aspect of GNSS reference station network RTK information;
    monitoring results of said comparing for indication of occurrence of compromise to operational integrity of said GNSS reference station; and
    detecting an indication of occurrence of compromise to the operational integrity of said GNSS reference station has occurred.

2. The method as recited in 1, further comprising:
    in response to said detecting an indication of occurrence of a compromise to said operational integrity, providing a compromise notification to a user of said GNSS reference station.

3. The method as recited in 1, further comprising:
    in response to said detecting an indication of occurrence of a compromise to said operational integrity, utilizing GNSS information from an RTK network to replace local over-the-air GNSS signals in the operation of said GNSS reference station.

4. The method as recited in 1, wherein said accessing GNSS reference station network RTK information station comprises:
    accessing the GNSS reference station network RTK information, wherein the GNSS reference station network RTK information is generated from inputs provided by a plurality of GNSS reference stations that does not include said GNSS reference station with which said location is associated.

5. The method as recited in 1, wherein said comparing at least one aspect of GNSS information generated local to said location of said GNSS reference station with a corresponding aspect of the GNSS reference station network RTK information comprises:
    comparing local observables of said GNSS reference station with corresponding synthetic local observables of the GNSS reference station network RTK information.

6. The method as recited in 1, wherein said comparing at least one aspect of GNSS information generated local to said location of said GNSS reference station with a corresponding aspect of the GNSS reference station network RTK information comprises:
    comparing satellite positioning domain information of said GNSS reference station with corresponding satellite positioning domain information of the GNSS reference station network RTK information.

7. The method as recited in 1, wherein said comparing at least one aspect of GNSS information generated local to said location of said GNSS reference station with a corresponding aspect of the GNSS reference station network RTK information comprises:
    comparing final positioning information of said GNSS reference station with corresponding final positioning solution information of the GNSS reference station network RTK information.

8. The method as recited in 1, wherein said comparing at least one aspect of GNSS information generated local to said location of said GNSS reference station with a corresponding aspect of the GNSS reference station network RTK information comprises:
    performing said comparing at said GNSS reference station.

9. The method as recited in 1, wherein said comparing at least one aspect of GNSS information generated local to said location of said GNSS reference station with a corresponding aspect of the GNSS reference station network RTK information comprises:
    performing said comparing at a location external to said GNSS reference station.

10. The method as recited in 1, wherein said monitoring results of said comparing for indication of occurrence of compromise to operational integrity of said GNSS reference station comprises:
    monitoring for said at least one aspect of GNSS information generated local to said location of said GNSS reference station to vary from said corresponding aspect of the GNSS reference station network RTK information in excess of a threshold associated with said at least one aspect, wherein exceeding said threshold is an indication of an occurrence of a compromise to said operational integrity.

11. The method as recited in 10, further comprising:
    adjusting said threshold based upon historical information for said location.

12. A non-transitory computer-readable storage medium having computer-readable instructions stored thereon which, when executed by a computer system, cause the computer system to perform a method of Global Navigation Satellite System (GNSS) reference station integrity assurance, said method comprising:
    comparing at least one aspect of GNSS information locally generated by a GNSS reference station to derive a location of said GNSS reference station with a corresponding aspect of GNSS reference station network Real Time Kinematic (RTK) information for said location;
    monitoring for said at least one aspect of GNSS information locally generated by said GNSS reference station to vary from said corresponding aspect of the GNSS reference station network RTK information in excess of a threshold associated with said at least one aspect, wherein exceeding said threshold is an indication of an occurrence of a compromise to operational integrity of said GNSS reference station; and in response to monitoring an indication of occurrence of a compromise to said operational integrity, utilizing GNSS information from an RTK network to replace local over-the-air GNSS signals in the operation of said GNSS reference station.

13. The non-transitory computer-readable storage medium of 12, further comprising:

adjusting said threshold based upon historical information for said location.

14. The non-transitory computer-readable storage medium of 12, wherein said comparing at least one aspect of GNSS information locally generated by said GNSS reference station with a corresponding aspect of the GNSS reference station network RTK information comprises:

comparing local observables of said GNSS reference station with corresponding synthetic local observables of the GNSS reference station network RTK information.

15. The non-transitory computer-readable storage medium of 12, wherein said comparing at least one aspect of GNSS information locally generated by said GNSS reference station with a corresponding aspect of the GNSS reference station network RTK information comprises:

comparing satellite positioning domain information of said GNSS reference station with corresponding satellite positioning domain information of the GNSS reference station network RTK information.

16. The non-transitory computer-readable storage medium of 12, wherein said comparing at least one aspect of GNSS information locally generated by said GNSS reference station with a corresponding aspect of the GNSS reference station network RTK information comprises:

comparing final positioning information of said GNSS reference station with corresponding final positioning solution information of the GNSS reference station network RTK information.

17. A Global Navigation Satellite System (GNSS) reference station integrity system, said system comprising:

a local-to-network comparator configured for comparing at least one aspect of GNSS information generated by a GNSS reference station to derive a location of said GNSS reference station with a corresponding aspect of GNSS reference station network RTK information generated for said location; and a compromise monitor configured for monitoring results of said comparing for indication of occurrence of compromise to operational integrity of said GNSS reference station.

18. The system of 17, further comprising:

a compromise notifier configured for providing a compromise notification to a user of said GNSS reference station in response to a monitored indication of occurrence of a compromise to said operational integrity.

19. The system of 17, further comprising said GNSS reference station, wherein said GNSS reference station is configured to utilize GNSS information from an RTK network to replace local over-the-air GNSS signals in the operation of said GNSS reference station in response to a monitored indication of occurrence of a compromise to said operational integrity.

20. The system of 17, wherein at least one of said local-to-network comparator and said compromise monitor is disposed as a portion of said GNSS reference station.

21. The system of 17, wherein at least one of said local-to-network comparator and said compromise monitor is disposed at a location external to said GNSS reference station.

* * * * *

UNITED STATES PATENT AND TRADEMARK OFFICE
CERTIFICATE OF CORRECTION

| | | |
|---|---|---|
| PATENT NO. | : 8,624,779 B2 | Page 1 of 1 |
| APPLICATION NO. | : 13/070677 | |
| DATED | : January 7, 2014 | |
| INVENTOR(S) | : Kendall Ferguson | |

It is certified that error appears in the above-identified patent and that said Letters Patent is hereby corrected as shown below:

On the Title Page, Column 2, item (56) under OTHER PUBLICATIONS line 5,  Delete: "Reseachers"

Insert: --Researchers--

Signed and Sealed this
Twenty-third Day of September, 2014

Michelle K. Lee
*Deputy Director of the United States Patent and Trademark Office*